US009347969B2

(12) United States Patent
Sakai et al.

(10) Patent No.: US 9,347,969 B2
(45) Date of Patent: May 24, 2016

(54) COMPOUND MICROSCOPE

(71) Applicant: OLYMPUS CORPORATION, Tokyo (JP)

(72) Inventors: Nobuaki Sakai, Hachioji (JP); Yoshitsugu Uekusa, Tachikawa (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/518,040

(22) Filed: Oct. 20, 2014

(65) Prior Publication Data

US 2015/0040273 A1 Feb. 5, 2015

Related U.S. Application Data

(63) Continuation of application No. PCT/JP2013/060520, filed on Apr. 5, 2013.

(30) Foreign Application Priority Data

Apr. 20, 2012 (JP) ................................. 2012-096668

(51) Int. Cl.
*G01Q 10/00* (2010.01)
*G01Q 30/02* (2010.01)
(Continued)

(52) U.S. Cl.
CPC .............. *G01Q 10/00* (2013.01); *G01Q 30/025* (2013.01); *G02B 21/0004* (2013.01); *G02B 21/0088* (2013.01); *G02B 21/06* (2013.01)

(58) Field of Classification Search
USPC ............................................................ 850/1
See application file for complete search history.

(56) References Cited

U.S. PATENT DOCUMENTS 5,705,814 A    1/1998   Young et al.
5,952,562 A *   9/1999   Yagi ....................... B82Y 35/00
                                                                               73/105

(Continued)

FOREIGN PATENT DOCUMENTS

JP    H09-145721 A    6/1997
JP    2002-082036 A    3/2002

(Continued)

OTHER PUBLICATIONS

English translation of International Preliminary Report on Patentability together with the Written Opinion from related International Application No. PCT/JP2013/06050, dated Oct. 30, 2014.
International Search Report dated May 28, 2013 issued in PCT/JP2013/060520.
Extended Supplementary European Search Report dated Dec. 16, 2015 from related European Application No. 13 77 7822.1.

(Continued)

*Primary Examiner* — Phillip A Johnston
(74) *Attorney, Agent, or Firm* — Scully, Scott, Murphy & Presser, P.C.

(57) ABSTRACT

A compound microscope of an optical microscope and a scanning probe microscope includes a stage to support a sample substrate holding a sample, and a cantilever chip having a substrate, a cantilever supported by the substrate, and a probe provided at the free end of the cantilever. The compound microscope further includes a scanner to hold the cantilever chip so that the probe faces the sample substrate and so that the substrate is inclined with respect to the sample substrate and to three-dimensionally scan the cantilever chip with respect to the sample substrate, a displacement sensor to optically detect the displacement of the cantilever, and an illumination light source to apply illumination light for observation by the optical microscope to the sample through the space between the substrate and the sample substrate.

8 Claims, 10 Drawing Sheets

(51) Int. Cl.
  G02B 21/00    (2006.01)
  G02B 21/06    (2006.01)

(56) References Cited

U.S. PATENT DOCUMENTS

| | | | | |
|---|---|---|---|---|
| 6,545,276 B1 * | 4/2003 | Sasaki | ................... | B82Y 20/00 250/216 |
| 7,692,138 B1 * | 4/2010 | Ray | ....................... | B82Y 20/00 250/216 |
| 2009/0038383 A1 | 2/2009 | Nakaue et al. | | |
| 2009/0265819 A1 | 10/2009 | Watanabe et al. | | |
| 2011/0070604 A1 | 3/2011 | Gimzewshi et al. | | |

FOREIGN PATENT DOCUMENTS

| JP | 2002-328082 A | 11/2002 |
|---|---|---|
| JP | 2006-090715 A | 4/2006 |
| JP | 2007-132781 A | 5/2007 |
| JP | 2008-224412 A | 9/2008 |

OTHER PUBLICATIONS

Japanese Office Action dated Dec. 22, 2015 from related Japanese Patent Application No. 2012-096668, together with an English language translation.

* cited by examiner

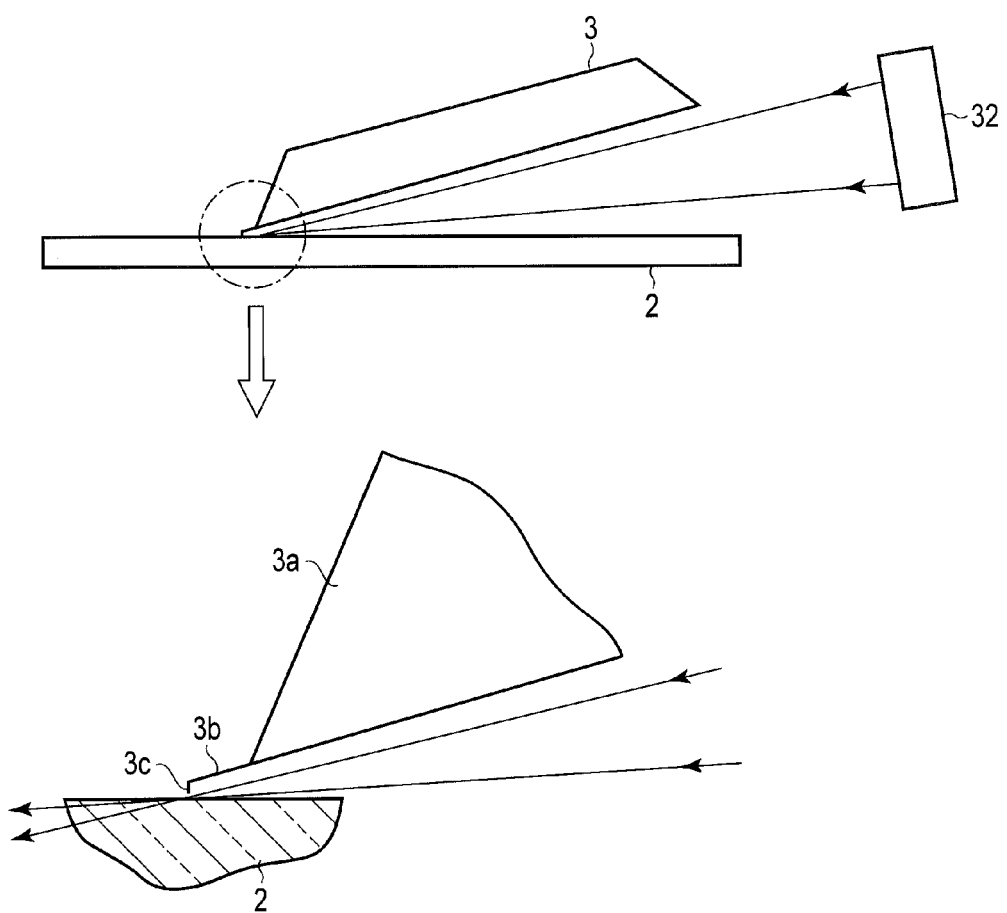
F I G. 5

COMPOUND MICROSCOPE

CROSS-REFERENCE TO RELATED APPLICATIONS

This application is a Continuation Application of PCT Application No. PCT/JP2013/060520, filed Apr. 5, 2013 and based upon and claiming the benefit of priority from prior Japanese Patent Application No. 2012-096668, filed Apr. 20, 2012, the entire contents of all of which are incorporated herein by reference.

BACKGROUND OF THE INVENTION

1. Field of the Invention

The present invention relates to a compound microscope of an optical microscope and a scanning probe microscope.

2. Description of the Related Art

A scanning probe microscope (SPM) is a scanning microscope, which mechanically scans a mechanical probe by a scanning mechanism to obtain information on a sample surface, and is a generic name of a scanning tunneling microscope (STM) anatomic force microscope (AFM), a scanning magnetic force microscope (MFM), a scanning near field optical microscope (SNOM), etc. The scanning probe microscope raster scan a sample and the mechanical probe relatively to each other in XY-directions to obtain surface information regarding a desired sample region through the mechanical probe, mapping and displaying the surface information on a TV monitor.

Among others, the AFM is a most widely used device, and comprises, as major mechanical features, a cantilever having a mechanical probe at its free end, an optical displacement sensor to detect the displacement of the cantilever, and a scanning mechanism to scan the mechanical probe and a sample relatively to each other. As the optical displacement sensor, a lever-type optical displacement sensor is most widely used because of its simple configuration and high displacement detection sensitivity. A light beam having a diameter of several μm to several ten μm is applied to the cantilever, and a change of the reflection direction of the reflected light depending on the curve of the lever is detected by, for example, a two-segments photodetector, so that the movement of the mechanical probe at the free end of the cantilever is detected and a corresponding electric signal is output. The scanning mechanism is controlled in a Z-direction so that the output is kept constant, while the scanning mechanism is scanned in the XY-directions at the same time, so that configurations of the sample surface are mapped and displayed on a monitor of a computer.

This AFM is generally combined with an inverted optical microscope in order to observe a bio-sample in a liquid. This is because the observation using the inverted optical microscope is advantageous not only to obtaining information on the sample but also to positioning the cantilever at a particular part of the sample.

When attempting to observe the motion of the bio-sample, it is observation velocity to be required for the AFM. For this purpose, one screen should be obtained within one second, preferably within 0.1 seconds. For higher velocity of the AFM, devices that are currently available on the market have reached a level that can achieve the goal regarding the periphery of electric circuits of the AFM device, while problems lie in the mechanical features. Particularly, these mechanical features include the scanning mechanism having a high scanning velocity, the cantilever that is flexible and has a high resonant frequency, and the optical-lever-type optical displacement sensor capable of detecting the displacement of the cantilever. For example, when an image having 100 pixels in the X-direction and 100 pixels in the Y-direction is loaded within 0.1 seconds, the scanning mechanism is required to attain a scanning frequency of 1 kHz or more in the X-direction, a scanning frequency of 10 Hz or more in the Y-direction, and a scanning frequency of 100 kHz or more in the Z-direction.

The high-frequency cantilever suited to the observation of the bio-sample preferably has a spring constant of 1 N/m or less, and a resonant frequency of 300 kHz. This cantilever has extremely small dimensions that are about one tenth of the dimensions of cantilevers that are currently available on the market. For example, a cantilever made of silicon nitride has a length of 10 μm, a width of 2 μm, and a thickness of 0.1 μm. This cantilever has a spring constant of approximately 1 N/m, a resonant frequency in the atmosphere of approximately 1.2 MHz, and a resonant frequency in the liquid of approximately 400 kHz.

The optical displacement sensor further requires a light focusing optical system to form a spot of converged light having a diameter of several μm or less in order to detect an extremely small displacement of the cantilever.

As described above, for the high-velocity observation of the bio-sample by the AFM, it is preferable that a small cantilever flexible and having a high resonant frequency is available and that a scanning mechanism to perform high-velocity scanning is provided.

Jpn. Pat. Appln. KOKAI Publication No. 2002-82036 has disclosed a compound microscope in which an inverted optical microscope is combined with an AFM to meet the needs.

BRIEF SUMMARY OF THE INVENTION

The present invention is directed to a compound microscope of an optical microscope and a scanning probe microscope, the compound microscope comprising a stage to support a sample substrate holding a sample, a cantilever chip comprising a substrate, a cantilever supported by the substrate, and a probe provided at the free end of the cantilever, a scanner to hold the cantilever chip so that the probe faces the sample substrate and so that the substrate is inclined with respect to the sample substrate and to three-dimensionally scan the cantilever chip with respect to the sample substrate, a displacement sensor to optically detect the displacement of the cantilever, and an illumination light source to apply illumination light for observation by the optical microscope to the sample through the space between the substrate and the sample substrate.

Advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute apart of the specification, illustrate embodiments of the invention, and together with the general description given above and the detailed description of the embodiments given below, serve to explain the principles of the invention.

FIG. 5 shows the cantilever chip and the illumination light source shown in FIG. 1 and paths of illumination light;

DETAILED DESCRIPTION OF THE INVENTION

Hereinafter, embodiments of the present invention will be described with reference to the drawings.

<First Embodiment>

Figure 1:
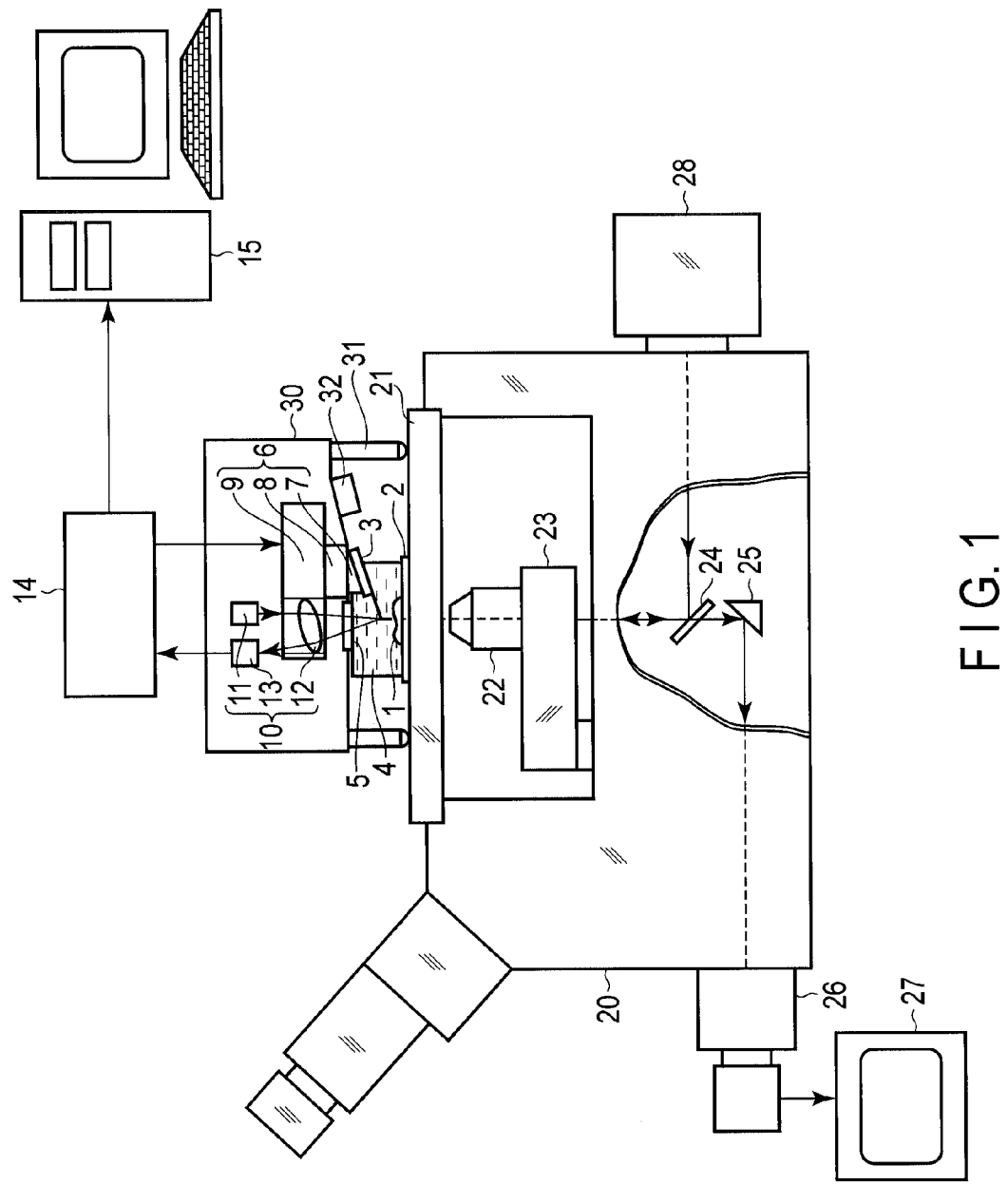
FIG. 1 shows a compound microscope according to a first embodiment.

The configuration of a compound microscope according to the present embodiment is shown in FIG. 1.

As shown in FIG. 1, the compound microscope according to the present embodiment comprises an inverted optical microscope, which is an optical microscope, and an atomic force microscope (AFM), which is a scanning probe microscope.

The inverted optical microscope comprises a microscope body 20, a microscope stage 21, an objective lens 22, a revolver 23, a half mirror 24, a mirror 25, a CCD camera 26, a television monitor 27, and an epi-illumination light source 28. A sample substrate 2 such as a glass slide is supported on the microscope stage 21, and a sample 1 and a solution 4 are held on the sample substrate 2. The inverted optical microscope is mainly used for submerged optical observation of the sample 1.

The AFM comprises a cantilever chip 3, an XYZ scanner 6, an optical-lever-type displacement sensor 10, a housing 30 holding the XYZ scanner 6 and the optical-lever-type displacement sensor 10, a pillar 31 supporting the housing 30 above the microscope stage 21, a controller 14, and a computer 15.

Figure 2:
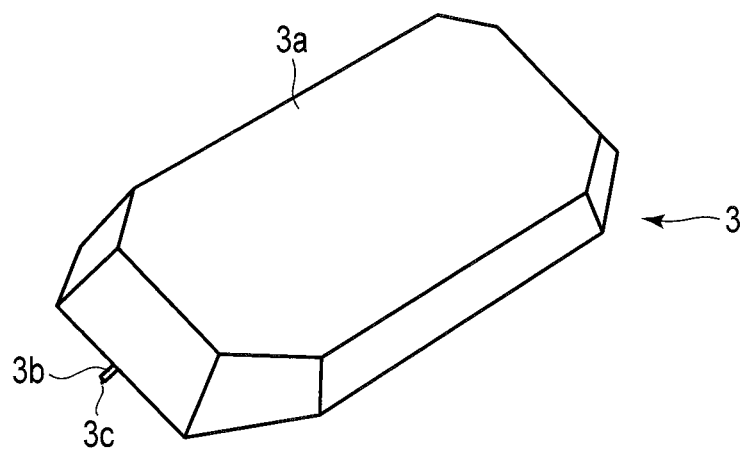
FIG. 2 is a perspective view of a cantilever chip shown in FIG. 1.

As shown in FIG. 2, the cantilever chip 3 comprises a substrate 3a, a cantilever 3b supported by the substrate 3a, and a probe 3c provided at the free end of the cantilever 3b.

Figure 3:
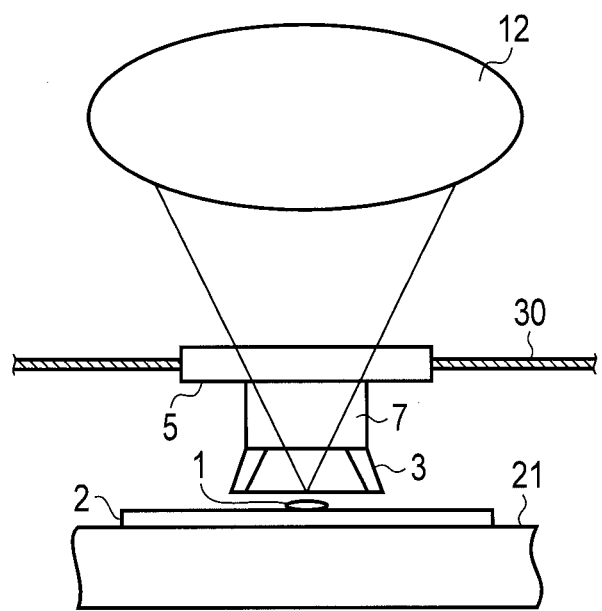
FIG. 3 is an enlarged view of the cantilever chip and a focusing lens shown in FIG. 1 seen from another direction.

The size ratio shown in FIG. 2 and FIG. 3 are close to the actual size ratio between the substrate 3a and the cantilever 3b. In the cantilever chip 3 in FIG. 1, the cantilever 3b is drawn large for illustration purpose.

The XYZ scanner 6 comprises a cantilever chip holder 7, a Z scanner 8, and an XY scanner 9. The cantilever chip holder 7 holds the cantilever chip so that the probe 3c faces the sample substrate 2 and so that the substrate 3a is inclined with respect to the sample substrate 2. The cantilever chip holder 7 is held by the free end of the Z scanner 8. The Z scanner 8 is held by the XY scanner 9. The Z scanner 8 and the XY scanner 9 cooperate to three-dimensionally scan the cantilever chip 3 with respect to the sample substrate 2.

Figure 4:
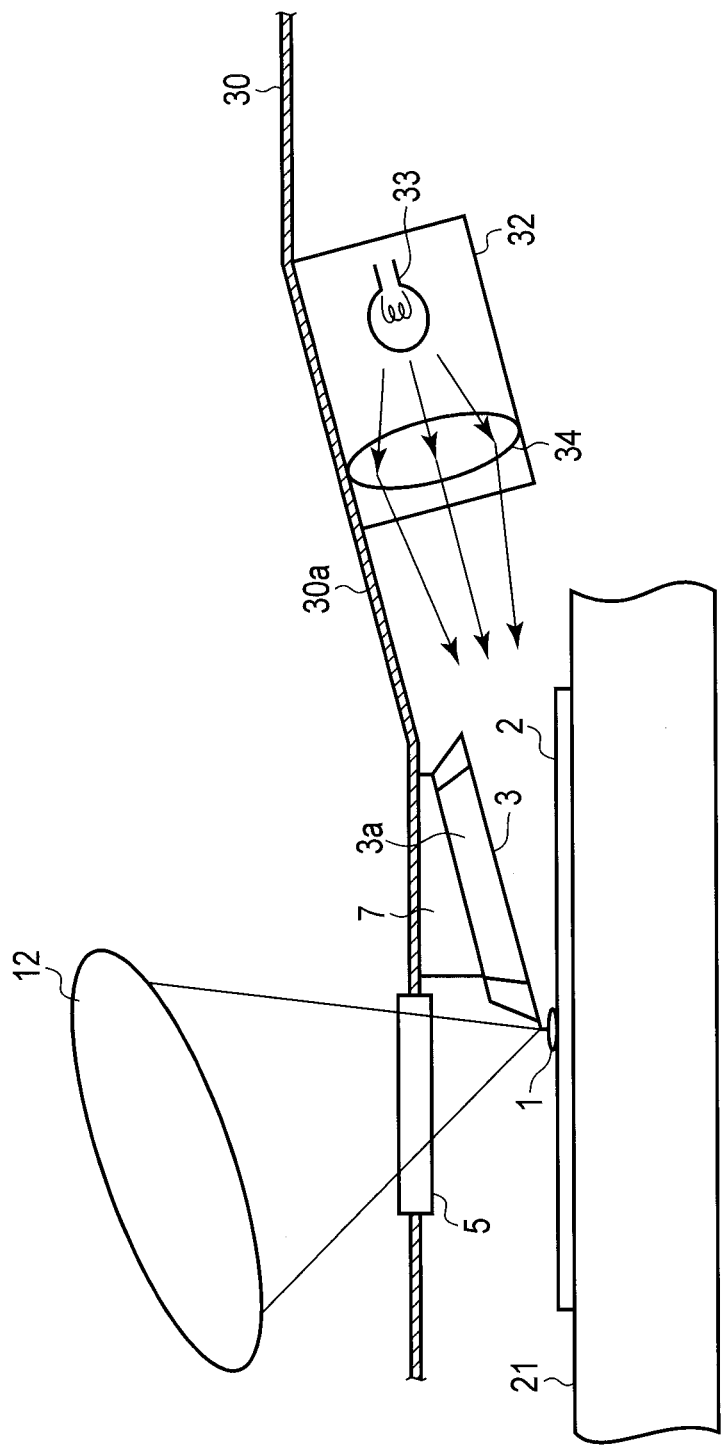
FIG. 4 is an enlarged view of the cantilever chip, the focusing lens, and an illumination light source shown in FIG. 1.

As shown in FIG. 3 and FIG. 4, the cantilever chip 3 is designed so that the inclination angle of the substrate 3a with respect to the sample substrate 2 is 5 degrees to 15 degrees, preferably, 10 degrees to 15 degrees. In the present embodiment, the inclination angle is described as being, for example, 15 degrees.

Here, "inclination with respect to the sample substrate 2" or "inclined with respect to the sample substrate 2" is synonymous with "inclination with respect to the microscope stage 21" or "inclined with respect to the microscope stage 21". That is, these are interchangeable. Moreover, the inclination of the substrate 3a with respect to the sample substrate 2 more precisely means the inclination of the major surface of the substrate 3a with respect to a sample substrate mounting surface of the microscope stage 21. The major surface of the substrate 3a refers to a plane on the side from which the probe 3c protrudes, and is the largest plane of the substrate 3a.

The optical-lever-type displacement sensor 10 comprises a laser light source 11, a focusing lens 12, and a photodetector 13. The laser light source 11 emits detection light. The focusing lens 12 converges the detection light emitted from the laser light source 11, and applies the converged light to a part close to the free end on the surface opposite to the surface of the cantilever 3b comprising the probe 3c. The photodetector 13 receives the reflected light from the cantilever 3b, and then detects the displacement of the free end, that is, the probe 3c of the cantilever 3b.

The housing 30 comprises a windowpane 5 for protecting the optical-lever-type displacement sensor 10 from the solution 4.

The Z scanner 8 is held by the XY scanner 9, and is XY scanned. The focusing lens 12 is also held by the XY scanner 9, and is XY scanned together with the Z scanner 8. Therefore, the focusing lens 12 and the cantilever chip 3 are simultaneously XY scanned for the same displacement by the XY scanner 9. In this way, the XY scanner 9, the Z scanner 8, the cantilever chip holder 7, the cantilever chip 3, and the focusing lens 12 constitute a detection light following type lever scan mechanism.

The XYZ scanner 6 and the optical-lever-type displacement sensor 10 are connected to the controller 14, and controlled by the computer 15. Observation results can be processed by the computer 15, and displayed on the monitor TV.

In the AFM having the above configuration, the cantilever 3b and the focusing lens 12 are configured as described below for higher observation velocity.

The cantilever 3b is, for example, a cantilever made of silicon nitride, and has an extremely small shape with a length of 10 μm, a width of 2 μm, and a thickness of 0.1 μm.

To detect the displacement of the extremely small cantilever 3b, the focusing lens 12 has an optical property with NA=0.4 or more so that the spot diameter of the converged light will be several μm or less.

Moreover, the focusing lens 12 to be used is a small and light focusing lens having a diameter of 10 mm or less, preferably, 5 mm or less to permit high-velocity scanning.

FIG. 3 and FIG. 4 show a rough layout of the cantilever chip 3, the focusing lens 12, and others. In FIG. 3 and FIG. 4, for example, the length of the substrate 3a is approximately 3 mm, and the width is approximately 1.6 mm. The focusing lens 12 has an NA ≈0.4, a diameter of approximately 5 mm, and a focal distance of approximately 5 mm. The substrate 3a is held at an angle of approximately 15 degrees with respect to the sample substrate 2.

As shown in FIG. 4, the housing 30 has an inclined plane 30a inclined with respect to the sample substrate 2 in the rear of the substrate 3a of the cantilever chip 3 (on the side opposite to the cantilever 3b with reference to the substrate 3a). The inclination angle of the inclined plane 30a with respect to the sample substrate 2 is equal to or more than the inclination angle of the substrate 3a with respect to the sample substrate 2, that is, 15 degrees or more. For example, the inclined plane 30a is substantially parallel to the substrate 3a. That is, this inclined plane 30a forms an angle of approximately 15 degrees with respect to the sample substrate 2. An illumination light source 32 is held on the inclined plane 30a. The illumination light source 32 emits illumination light for observation by the inverted optical microscope. The illumination light source 32 comprises a light source lamp 33 and a condenser lens 34.

Since the AFM is of a lever scanning type, the compound microscope according to the present embodiment configured as above has fewer restrictions on the sample 1 and the sample substrate 2.

As shown in FIG. 5, the illumination light source 32 illuminates the sample 1 through the space between the substrate 3a and the sample substrate 2 from the side opposite to the objective lens 22 with reference to the microscope stage 21, in particular, from the rear of the substrate 3a of the cantilever chip 3.

This illumination is mainly oblique illumination of the sample 1 from the direction of the cantilever chip 3, and is included in dark field illumination and oblique illumination. The dark field illumination and the oblique illumination are illumination methods that are advantageous to low-contrast samples, and are suited to observation of microstructures. That is, the sample 1 is illuminated by the illumination method suited to the low-contrast samples.

Figure 6:
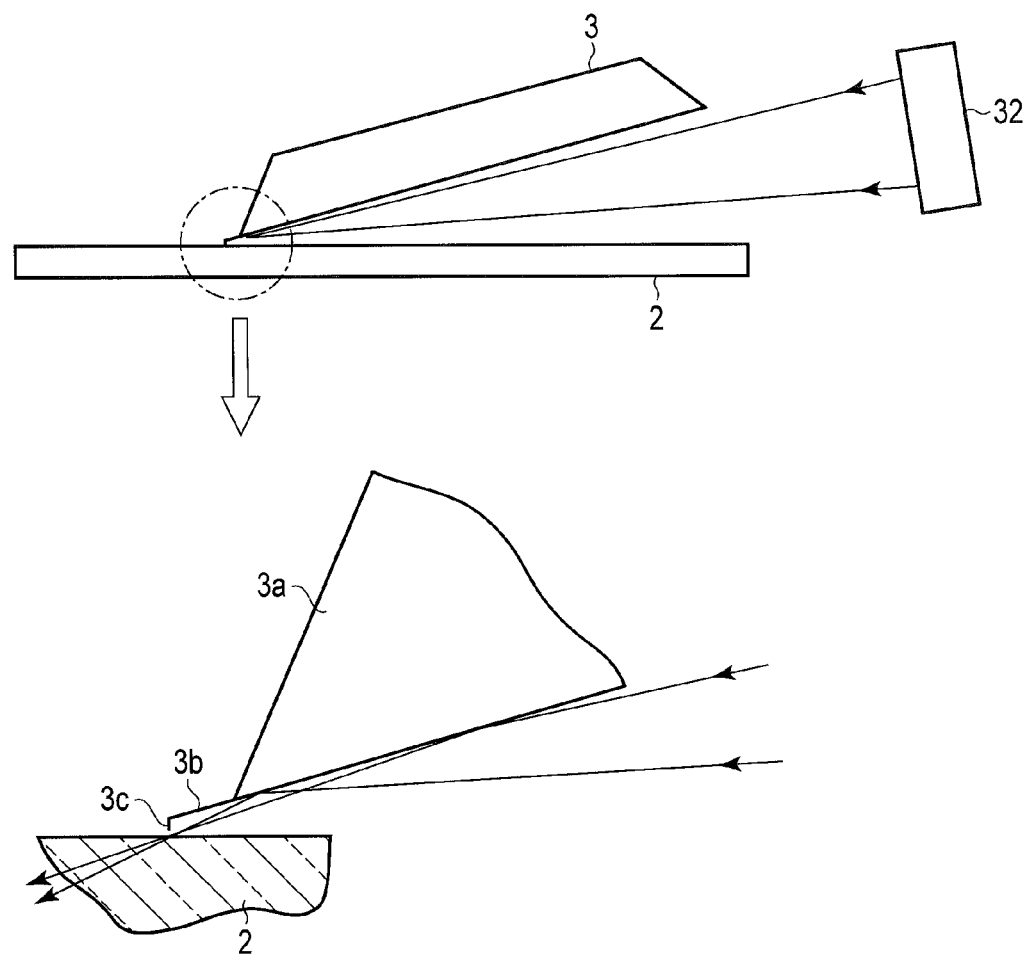
FIG. 6 shows the cantilever chip and the illumination light source shown in FIG. 1 and paths of the illumination light.

The sample 1 is not only directly illuminated but also illuminated by reflected illumination light from the substrate 3a and the cantilever 3b as shown in FIG. 6, and can therefore be efficiently illuminated. This reflected illumination light may permit the sample 1 to be observed by bright field illumination.

It is preferable to use a small high-intensity white LED for the light source lamp 33 of the illumination light source 32. This is attributed to the following reasons: high luminous efficiency of the high-intensity white LED; low head generation; and a small size.

Figure 7:
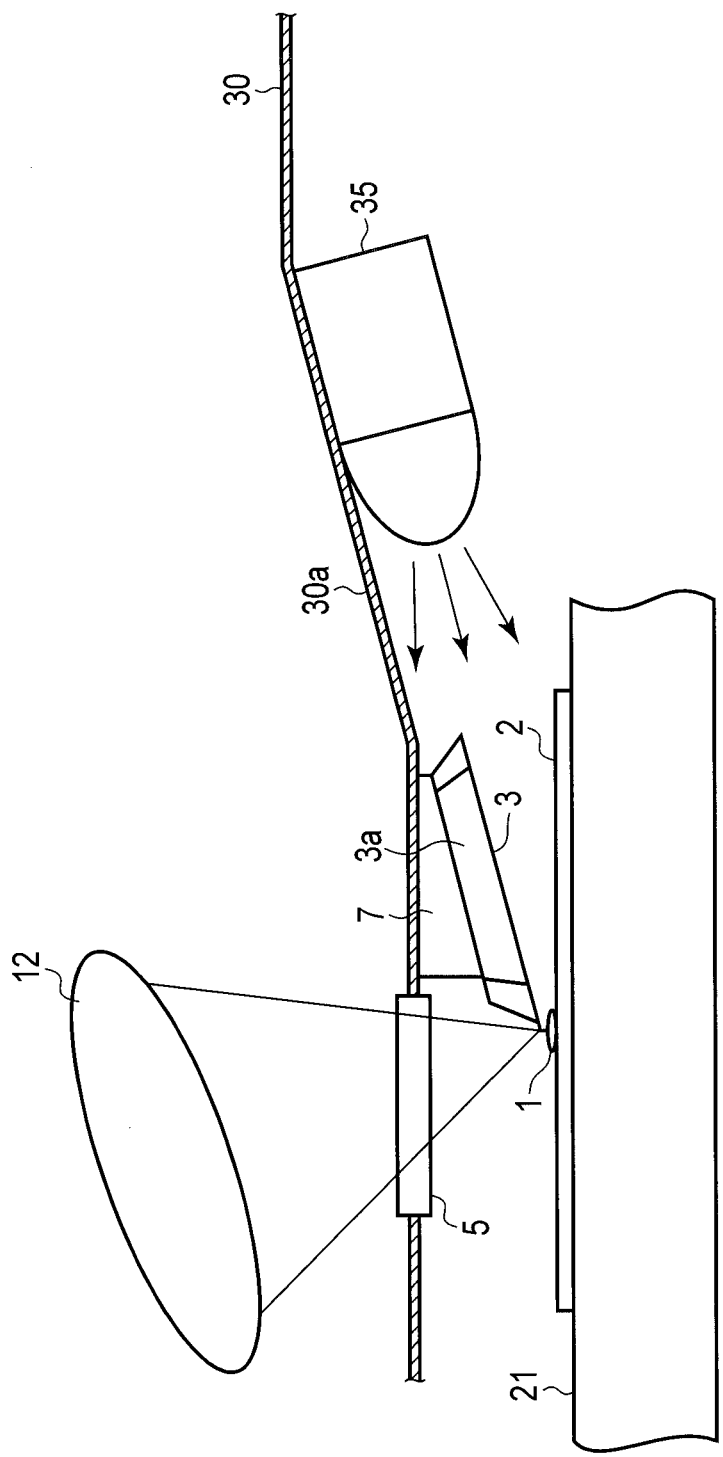
FIG. 7 shows a modification of the compound microscope according to the first embodiment.

As shown in FIG. 7, the illumination light source 32 may be replaced with, for example, a small high-intensity white LED 35. Illumination light of the high-intensity white LED 35 is directly applied to the sample without the generation of converged light by the condenser lens.

Figure 8:
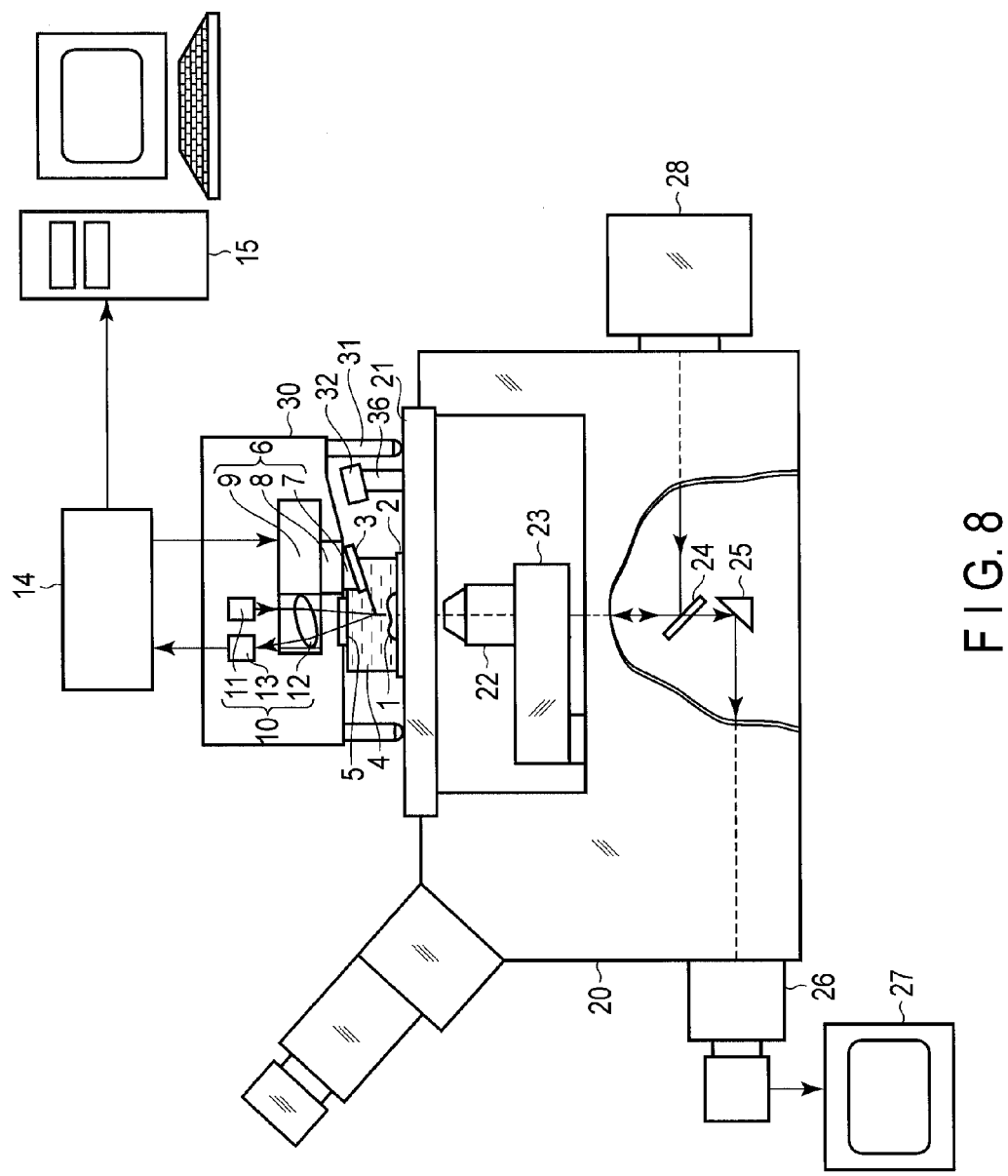
FIG. 8 shows another modification of the compound microscope according to the first embodiment.

Furthermore, as shown in FIG. 8, the illumination light source 32 (or the high-intensity white LED 35) may be held on, for example, a holding member 36 provided on the microscope stage 21 instead of being held on the inclined plane 30a.

Figure 11:
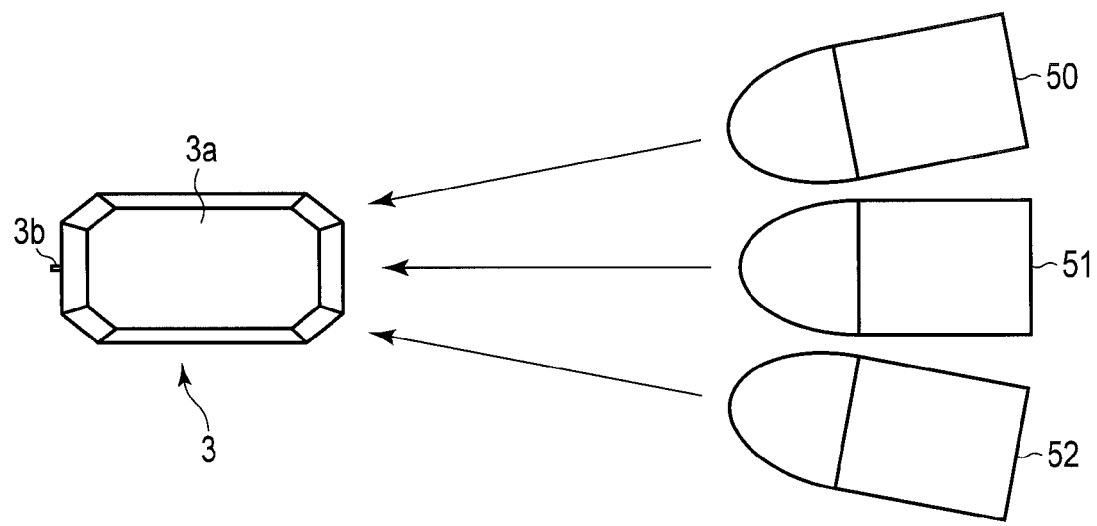
FIG. 11 shows another configuration alternative to the illumination light sources according to the first embodiment and the second embodiment.

In addition, the illumination light source 32 may be replaced with another illumination light source having light-emitting elements (high-intensity white LEDs) 50, 51, and 52, as shown in FIG. 11. The light-emitting elements 50, 51, and 52 are arranged in the rear of the substrate 3a so that the optical axes thereof extend over from the sample 1. As a result, the amount of illumination light can be increased. This method is extremely advantageous to the compound microscope in which the distance between the sample substrate 2 or the microscope stage 21 and the housing 30 is short.

<Second Embodiment>

Figure 9:
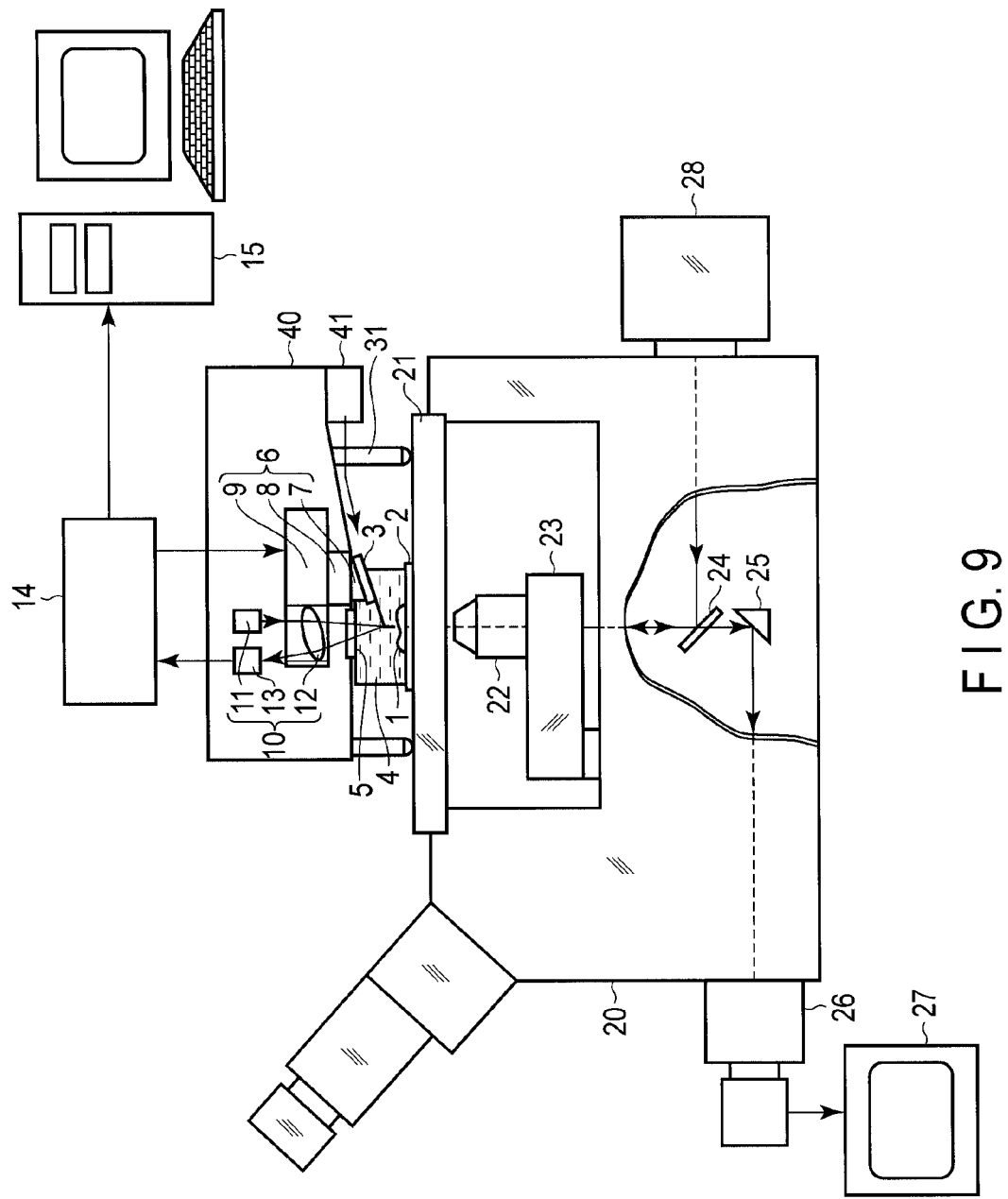
FIG. 9 shows a compound microscope according to a second embodiment.

The configuration of a compound microscope according to the present embodiment is shown in FIG. 9. As shown in FIG. 9, the compound microscope according to the present embodiment is the same as the compound microscope according to the first embodiment shown in FIG. 1 except for the housing and the illumination light source.

A housing 40 has an inclined plane 40a inclined with respect to the sample substrate 2 in the rear of the substrate 3a of the cantilever chip 3. The inclination angle of the inclined plane 40a with respect to the sample substrate 2 is equal to or less than the inclination angle of the substrate 3a with respect to the sample substrate 2, that is, 15 degrees or less, for example, approximately 7 to 8 degrees. This inclined plane 40a is mirrored. That is, the inclined plane 40a is a mirror surface.

Figure 10:
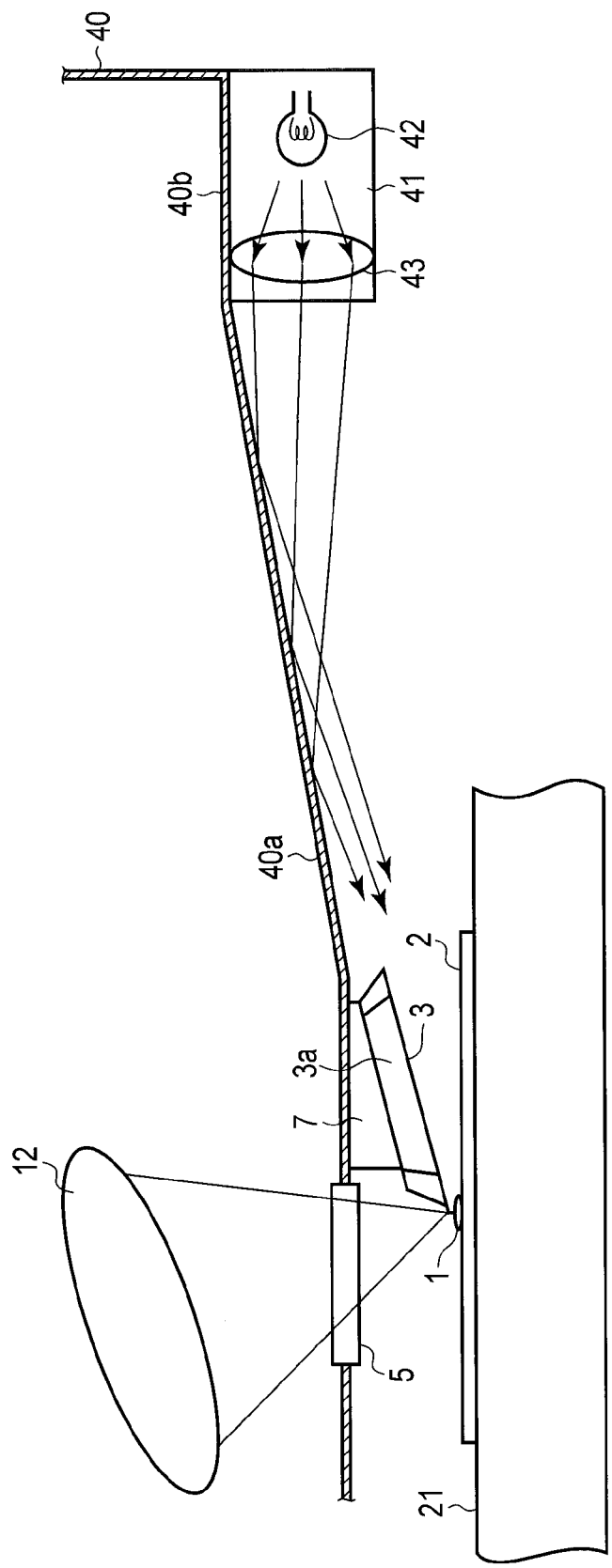
FIG. 10 is an enlarged view of the cantilever chip, the focusing lens, and an illumination light source shown in FIG. 9.

The housing 40 further has a surface 40b parallel to the sample substrate 2 in the rear of the inclined plane 40a. An illumination light source 41 is held on the surface 40b. As shown in FIG. 10, the illumination light source 41 comprises a light source lamp 42 and a condenser lens 43.

In the compound microscope according to the present embodiment configured as above, illumination light emitted from the illumination light source 41 can be reflected by the inclined plane 40a and guided to the sample 1. As a result, the illumination light source 41 illuminates the sample 1 through the space between the substrate 3a and the sample substrate 2 from the rear of the substrate 3a of the cantilever chip 3. Therefore, advantageous effects similar to those according to the first embodiment can be obtained.

Furthermore, in the compound microscope according to the present embodiment, the illumination light source 41 can be located relatively far from the sample 1 and the substrate 3a. This allows a higher degree of freedom in the size and arrangement design of the illumination light source 41. Moreover, the effect of heat generated by the illumination light source 41 can also be reduced.

In the present embodiment as well as in the first embodiment, a small high-intensity white LED is preferably used for the light source lamp 42. The illumination light source 41 may be replaced with a high-intensity white LED, and light may be directly applied to the sample without the generation of converged light by the condenser lens. The illumination light source 41 (or the high-intensity white LED) may be held on, for example, a holding member provided on the microscope stage 21 instead of being held on the surface 40b. In addition, the illumination light source 41 may be replaced with another illumination light source having light-emitting elements (high-intensity white LEDs) 50, 51, and 52, as shown in FIG. 11. The light-emitting elements 50, 51, and 52 are arranged in the rear of the substrate 3a so that the optical axes thereof extend over from the sample 1. As a result, the amount of illumination light can be increased. This method is extremely advantageous to the compound microscope in which the distance between the sample substrate 2 or the microscope stage 21 and the housing 40 is short.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A compound microscope of an optical microscope and a scanning probe microscope, the compound microscope comprising:
    a stage to support a sample substrate holding a sample;
    a cantilever chip comprising a substrate, a cantilever supported by the substrate, a probe provided at a free end of the cantilever;

a scanner to hold the cantilever chip so that the probe faces the sample substrate and so that the substrate is inclined with respect to the sample substrate and to three-dimensionally scan the cantilever chip with respect to the sample substrate;

a displacement sensor to optically detect the displacement of the cantilever; and an illumination light source to apply illumination light for observation by the optical microscope to the sample through a space between the substrate and the sample substrate, the illumination light source being arranged such that the illumination light is emitted from an end of the substrate opposite to the free end of the cantilever.

2. The compound microscope according to claim 1, comprising a housing holding the scanner and the displacement sensor, wherein the housing has an inclined plane inclined with respect to the sample substrate, and the inclination angle of the inclined plane with respect to the sample substrate is equal to or more than the inclination angle of the substrate with respect to the sample substrate, and the illumination light source applies the illumination light to the sample through the space between the inclined plane and the stage.

3. The compound microscope according to claim 2, wherein the illumination light source is held on the inclined plane.

4. The compound microscope according to claim 1, comprising a housing holding the scanner and the displacement sensor, wherein the housing has a mirror surface inclined with respect to the sample substrate, and the inclination angle of the mirror surface with respect to the sample substrate is equal to or less than the inclination angle of the substrate with respect to the sample substrate, and the illumination light source applies the illumination light to the sample via reflection by the mirror surface.

5. The compound microscope according to claim 1, wherein the illumination light source includes light-emitting elements, and the light-emitting elements are arranged so that the optical axes thereof extend over from the sample.

6. The compound microscope according to claim 1, wherein the inclination angle of the substrate with respect to the sample substrate is 5 degrees to 15 degrees.

7. The compound microscope according to claim 1, wherein the optical microscope comprises an inverted optical microscope configured to observe the sample through the sample substrate.

8. The compound microscope according to claim 1, comprising an illumination light source that emits light for observing the sample through the optical microscope, the illumination light source and the cantilever chip being arranged such that the illumination light is reflected towards the sample from at least one of the substrate and the cantilever.

\* \* \* \* \*